(12) United States Patent
Sugikawa et al.

(10) Patent No.: US 7,320,534 B2
(45) Date of Patent: Jan. 22, 2008

(54) DISPLAY DEVICE

(75) Inventors: Tomohiko Sugikawa, Fujieda (JP); Keiichi Nagano, Nagaoka (JP); Yuichi Takahashi, Nagaoka (JP); Teruko Yokoo, Nagaoka (JP)

(73) Assignees: Murakami Corporation, Shizuoka-shi (JP); Nippon Seiki Co., Ltd., Nagaoka-shi (JP)

( * ) Notice: Subject to any disclaimer, the term of this patent is extended or adjusted under 35 U.S.C. 154(b) by 242 days.

(21) Appl. No.: 11/149,212

(22) Filed: Jun. 10, 2005

(65) Prior Publication Data

US 2006/0018119 A1    Jan. 26, 2006

(30) Foreign Application Priority Data

Jul. 23, 2004    (JP) .............................. 2004-215746

(51) Int. Cl.
*F21V 9/10*    (2006.01)
*G02B 27/14*    (2006.01)

(52) U.S. Cl. .......................... 362/293; 362/561; 345/9; 359/634

(58) Field of Classification Search ................. 362/329, 362/293, 231; 345/7, 9; 359/629–631
See application file for complete search history.

(56) References Cited

FOREIGN PATENT DOCUMENTS

| DE | 1 115 657 | | 10/1961 |
| JP | 64-35143 | | 3/1989 |
| JP | 4-101581 | | 9/1992 |
| JP | 2003-161906 | | 6/2003 |
| KR | 2002004339 A | * | 1/2002 |

* cited by examiner

*Primary Examiner*—Ali Alavi
(74) *Attorney, Agent, or Firm*—Oblon, Spivak, McClelland, Maier & Neustadt, P.C.

(57) ABSTRACT

Disclosed is a display device at a low cost which enhances the color purity of light to be projected, and which resists deterioration due to ambient light such as infrared ray. This display device includes an LED, an optical member for selectively outputting light components, of which wavelength is a predetermined minimum-limit wavelength or longer, from incident light, and a mirror for selectively reflecting light components, of which wavelength is a predetermined maximum-limit wavelength or shorter, from irradiated light. One of the optical member or the mirror receives light directly from the LED, and outputs it to the other. Subsequently, the other receives the light from one of the optical member and the mirror, and outputs it.

20 Claims, 3 Drawing Sheets

(a) CHARACTERISTICS OF MIRROR AND FILTER (b) ASSUMED COMBINED CHARACTERISTICS

DISPLAY DEVICE

BACKGROUND OF THE INVENTION

1. Field of the Invention

The present invention relates to a display device, more specifically to a display device that projects images on a windshield of a vehicle, or on any other surfaces.

2. Cross Reference to Related

The present application claims priority under 35 U.S.C. § 119 to Japanese Patent Application No. 2004-215746, filed on Jul. 23, 2004, entitled "DISPLAY DEVICE". The contents of that application are incorporated herein by reference in their entirety.

3. Description of the Related Art

In a typical model of display devices for projecting images on a front window (i.e. windshield) of a vehicle, head up displays (HUDs) have been known. One example of HUDs is equipped with a dichroic mirror in order to efficiently project only colored light sent out from its display segment(s) or the like (refer to Utility Model Application Publication 64-35143). This dichroic mirror selectively reflects red light emitted from heater wires of a vacuum fluorescent display (VFD).

Another example of HUDs is constituted by a member that selectively reflects specific-colored light or makes it pass through, so that an extremely bright projection is obtained (refer to Japanese Unexamined Patent Application Publication 2003-161906). In addition, further example of HUDs is provided with coating layers that selectively reflect specific-colored light for the purpose of preventing the deterioration or wash-out of its display section due to ambient light (refer to Utility Model Application Publication 4-101581).

In the above display devices, it has been demanded that the color purity of projected light is improved so that clear images appear on a screen. However, the display section of the display devices may be affected by ambient light. To give an example, when an infrared ray or visible light contained in ambient light is irradiated on a display section, it may deteriorate because of heat generated by the irradiated light. This becomes a serious problem.

In order to meet the demand and to overcome the above problem, the present invention has been conceived.

SUMMARY OF THE INVENTION

According to an aspect of the present invention, there is provided, a display device for projecting an image, including:

(a1) an LED for emitting light;
(b1) an optical member for selectively outputting light components, of which wavelength is a predetermined minimum-limit wavelength or longer, from incident light, wherein the minimum-limit wavelength is shorter than a peak wavelength of light from the LED and lies within a FWHM of the light from the LED; and
(c1) a mirror for selectively reflecting light components, of which wavelength is a predetermined maximum-limit wavelength or shorter, from irradiated light, wherein the maximum-limit wavelength is longer than the peak wavelength of the light from the LED and lies within the FWHM of the light from the LED.

In the above display device, one of the optical member and the mirror receives light directly from the LED, and outputs it to the other. Subsequently, the other of the optical member and the mirror receive the light from one of the optical member and the mirror, and outputs it.

According to another aspect of the present invention, there is provided, a display device for projecting an image, including:

(a2) an LED for emitting light:
(b2) an optical member for selectively outputting light components, of wavelength is a predetermined minimum-limit wavelength or longer, from incident light, wherein the minimum-limit wavelength is shorter than a peak wavelength of light from the LED; and
(c2) a mirror for selectively reflecting light components, of which wavelength is a predetermined maximum-limit wavelength or shorter, from irradiated light, wherein the maximum-limit wavelength is longer than a peak wavelength of light from the LED.

In this display device, one of the optical member and the mirror receives light directly from the LED and outputs it to the other. Subsequently, the other receives the light from one of the optical member and the mirror, and outputs it. In addition, respective light intensities of the LED at the minimum-limit and maximum-limit wavelengths are set to be at least 10% of that at the peak wavelength.

In conclusion, it is possible to provide a display device at a low cost which enhances the color purity of light to be projected, and which resists deterioration due to ambient light such as infrared ray. In addition, this display device can be applied appropriately to a head up display for vehicles or something similar.

BRIEF DESCRIPTION OF THE DRAWINGS

For more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

A detail description will be given below, of a display device according to one embodiment of the present invention with reference to accompanying drawings.

Figure 1:
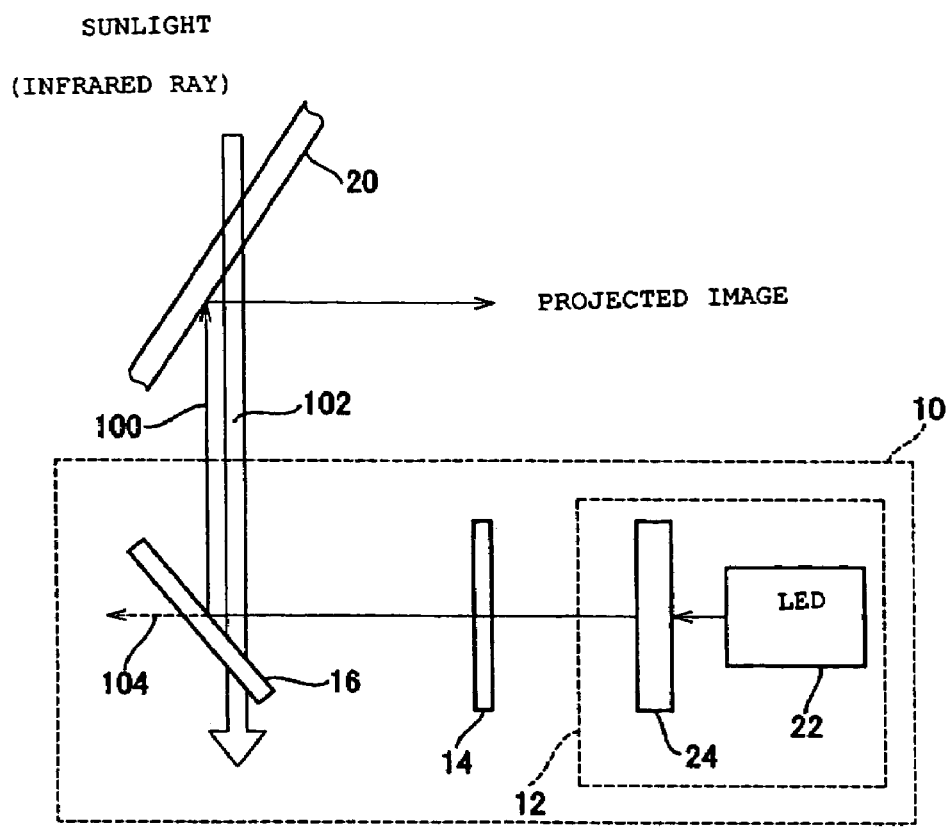
FIG. 1 is a view depicting an arrangement of a display device 10 according to one embodiment of the present invention.

Referring to FIG. 1, a display device 10 is a head up display (HUD) for vehicles, and it projects images on a front window 20. This display device 10 includes a display section 12, a filter 14 and a mirror 16. The display section 12 is composed of a light emitting diode (LED) 22 and a liquid crystal display (LCD) 24. This LED 22 serves as a back light source of the LCD 24, and emits monochromatic visible light such as orange or umber-colored light. The LCD 24 is a projection type liquid crystal panel. It displays images to be displayed on the front window 20, and makes light from the LED 22 pass through.

The filter 14 is an example of an optical member according to one embodiment of the present invention. When light from the LED 22 is incident to the filter 14 through the LCD 24, the filter 14 allows only light components, of which wavelength is equal to/longer than a predetermined minimum-limit wavelength, to pass through. This minimum-limit wavelength is shorter than the peak wavelength of light from the LED 22, and lies within the full width at half maximum (FWHM) of light from the LED 22. Thus, the filter 14 blocks the light components with a wavelength shorter than the minimum-limit wavelength. It is preferable that the filter 14 has light-transmittance of equal to/more than 90% at wavelengths of longer than the minimum-limit wavelength, and equal to/less than 10% at wavelengths of the minimum-limit wavelength or shorter.

The mirror 16 receives the light transmitted from the filter 14, and reflects the light with a wavelength of shorter than a predetermined maximum-limit wavelength. This maximum-limit wavelength is longer than the peak wavelength of light from the LED 22, and lies within the FWHM of light from the LED 22. It is preferable that the mirror 16 has light-transmittance of equal to/more than 90% at wavelengths of shorter than the maximum-limit wavelength, and equal to/less than 10% at wavelengths of the maximum-limit wavelength or longer. Hence, when the light from the LED 22 through the filter 14 is irradiated on the mirror 16, it blocks the light components with a wavelength of longer than the maximum-limit wavelength. Specifically, the mirror 16 renders these light components pass through, as shown by an arrow 104.

In this way, the mirror 16 reflects light selectively, and irradiates the light on the front window 20 as shown by an arrow 100 so that an image is projected thereon. Consequently, the mirror 16 projects an image on the front window 20 in accordance with the light incident from the filter 14.

When the light from the LED 22 are incident to the above configuration of both the filter 14 and the mirror 16, they send out only light components of which wavelength ranges from minimum-limit to maximum-limit wavelengths. Therefore, the display device 10 projects an image with light of which color purity is higher than that of light from the LED 22. Accordingly, the display device 10 of this embodiment enables the color purity of the projected light to be enhanced. The high color purity makes it possible to project images clearly without subjecting the front window 20 to any special processes.

On the other hand, ambient light such as sunlight is incident to the display device 10 through the front window 20, the mirror 16 allows light components, of which wavelength is equal to/longer than the maximum-limit wavelength, to pass through. In this way, the mirror 16 can block infrared and visible light components contained in ambient light, and these components thus do not reach the display section 12. Similarly, ambient light is incident to the filter 14, it blocks light components with a wavelength of equal to/shorter than the minimum-limit wavelength. Both the mirror 16 and the filter 14 block ambient light other than light of narrow band centered on colored light to be projected. This prevents the excess amount of ambient light from reaching the LCD 24, so that the deterioration of the LCD 24 due to heat generated by ambient light is reduced. As described above, the display device 10 of this embodiment makes it possible to enhance the color purity of light to be projected, as well as to reduce the deterioration of the LCD 24 because of ambient light.

In this embodiment, it may appear that the color purity of the projected light can be enhanced merely by using a filter or something similar that allows only specific-colored light to pass through. However, in fact, such a filter does not contribute to any improvement in the color purity. This is because a light source, that is, the LED 22 emits monochromatic light unlike a bulb or similar light.

In contrast, the filter 14 and the mirror 16 according to this embodiment have the minimum-limit and maximum-limit wavelengths, respectively, that are defined in accordance with the peak wavelength and FWHM of light from the LED 22. This enables the improvement in the color purity of the projected light even by using the LED, as a light source.

Moreover, it may be conceived that a band pass filter or something similar is used to enhance the color purity, instead of the filter 14 and the mirror 16. A band pass filter is made up of multiple filter portions, and allows only light within a specific narrow band to pass through, depending on the combination of these filter portions. Each of the filter portions has multiple films on its surfaces. Each of these films reflects, that is, blocks light components within a specific wavelength (spectrum) range, and it renders light outside the range pass through.

However, if infrared ray contained in ambient light is blocked by a band pass filter, then the filter needs to block light components over an extremely wide wavelength range covering visible light and infrared ray. This increases the number of films of each filter portion, thus causing cost increase.

In contrast, the display device 10 according to this embodiment blocks infrared ray contained in ambient light by using the mirror 16. In this case, the filter 14 needs to allows only light components, of which a specific wavelength within a visible light region, to pass through. Also, the mirror 16 needs to reflect only these light components. As a result, it is possible to provide the display device 10 at a low cost which enhances the color purity of light to be projected, and which resists deterioration due to ambient light such as infrared ray.

The mirror 16 does not have to reflect any light components with a wavelength of shorter than the maximum-limit wavelength. The mirror 16 merely needs to reflect components contained in the light from the LED 22, of which wavelength is shorter than the maximum-limit wavelength. Also, the filter 14 merely needs to allow light components in the light from the LED 22, of which wavelength is longer than the minimum-limit wavelength, to pass through. This configuration enables the reduction in cost of the display device 10.

Note that the configuration of the filter 14 and the mirror 16 may not be limited to that shown in FIG. 1. For example, the filter 14 may be placed between the mirror 16 and the front window 20. In this case, the mirror 16 needs to selectively reflect the incident light from the LED 22 through the LCD 24. In addition, the filter 14 allows the light having been reflected by the mirror 16 to selectively pass through and, then irradiates the front window 20 with the passed light. This configuration also makes it possible to provide the display device 10 at a low cost which enhances the color purity of light to be projected, and resists deterioration due to ambient light.

Alternatively, the display device 10 may be provided with a second mirror as an optical component according to another embodiment of the present invention, instead of the filter 14. This second mirror selectively reflects light components with a wavelength of longer than the minimum-limit wavelength. This alternative configuration also makes it possible to enhance the color purity of the light to be projected, and to reduce the deterioration of the display device 10 because of ambient light.

The display device 10 may be applied to a head up display for vehicles, as well as any display device. For example, it may be a display device for presenting images on a translucent screen such as a window.

The minimum-limit and maximum-limit wavelengths of the filter 14 and the mirror 16, respectively, may fall outside the FWHM of light from the LED 22. In this case, it is preferable that the minimum-limit and maximum-limit wavelengths are set based on between the peak wavelength of light from the LED 22 and the light intensity at the peak wavelength. For example, it is preferable that the respective light intensities of the LED 22 at the minimum-limit and maximum-limit wavelengths are set to equal to/more than 10% of the light intensity of the LED 22 at the peak wavelength. This configuration attenuates light with wavelengths of much shorter or longer than the peak wavelength, thereby enhancing the color purity of light from the LED 22. Note that when the LED 22 emits high purity light, if the light intensities of the LED 22 at the minimum-limit and maximum-limit wavelengths are lower than 10% of that at the peak wavelength, then the improvement of the color purity cannot be recognized by naked eyes.

Figure 2:
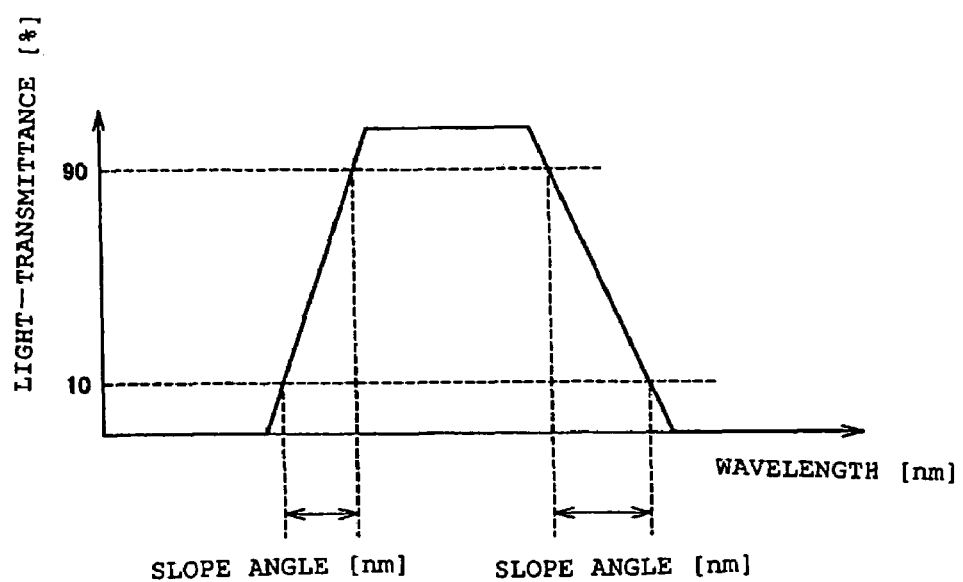
FIG. 2 is a schematic view depicting an example of characteristics of a filter 14 and a mirror 16 according to the embodiment.

In this embodiment, the filter 14 allows only specific light components, which are contained in incident light from the LED 22, to pass through, and then, outputs the components to the mirror 16. The mirror 16 reflects only specific light components in incident light from the filter 14, and then directs the components to the front window 20. Due to this configuration, the filter 14 and the mirror 16 can be regarded as a single filter unit, and this unit provides a light-transmittance property as shown in FIG. 2.

This filter unit has light-transmittance of equal to/more than 90% over a predetermined wavelength range, and has light-transmittance of equal to/less than 10% in other ranges. The light-transmittance of the filter unit is denoted by a ratio between the amounts of input light and output light. The input light is equivalent to incident light of the filter 14. The output light is equivalent to light which is transmitted from the filter 14 and which is reflected by the mirror 16. When light of a wide wavelength range is incident to this filter unit, it allows only light of a specific narrow wavelength range to pass through. Specifically, the narrow range extends from 25 nm to 100 nm. The wide range is equal to/more than 500 nm in width, which is wider than a visible light range. Note that the visible light range extends from 380 nm to 760 nm, and its wavelength range is 380 nm in width. This configuration extracts, from a visible light, only light components within a specific narrow wavelength range, so that the color purity is enhanced and unwanted light components including infrared components are blocked.

It is preferable that the filter unit has a peak light-transmittance range of equal to/narrower than 30 nm. Moreover, it is preferable that this filter unit has a slope angle of equal to/less than 30 nm at a predetermined polarized light component, and of equal to/less than 60 nm at natural light. This slope angle is denoted by bigger one selected from two wavelength ranges in which the light-transmittance is changed from 10% to 90% and from 90% to 10%, respectively. The above predetermined polarized light component means a light component having transmitted from the LCD 24 (P polarization in this embodiment). By this configuration, the color purity of the projected light is made much higher than that of light from the LED 22.

Each of the filter 14 and the mirror 16 is formed by stacking two different thin dielectric films alternately by predetermined times. In this embodiment, the filter 14 may be a dichroic or edge filter. The mirror 16 may be made of a dichroic or edge filter.

EXAMPLE

Concrete examples of the present invention will be shown below.

In the arrangement shown in FIG. 1, an LED for emitting burnt orange monochromatic light was used as the LED 22. Its peak wavelength was 612 nm and the FWHM was 50 nm. The filter 14 was positioned such that light from the display section 12 was incident to the filter 14 at 0°, and the mirror 16 was positioned such that light from the filter 14 was incident to the mirror 16 at 42.1°.

Note that the angles of the filter 14 and the mirror 16 are allowed to differ from the above angles, respectively. In this case, assume that the incident angles of the filter 14 and the mirror 16 are denoted by a° and b° in this order, they need to be arranged such that a relationship |a−b|≠0 is satisfied.

TABLE 1

DESIGN WAVELENGTH: 510 nm
INCIDENT LIGHT ANGLE: 0 degree
H (TiO$_2$): 2.3723
L (SiO$_2$): 1.4565

| LAYER NUMBER | MATERIAL | OPTICAL THICKNESS |
| --- | --- | --- |
| SUBSTRATE | GLASS | 0.174 |
| 1 | H | 0.160 |
| 2 | L | 0.226 |
| 3 | H | 0.246 |
| 4 | L | 0.190 |
| 5 | H | 0.150 |
| 6 | L | 0.210 |
| 7 | H | 0.210 |
| 8 | L | 0.210 |
| 9 | H | 0.210 |
| 10 | L | 0.250 |
| 11 | H | 0.250 |
| 12 | L | 0.250 |
| 13 | H | 0.250 |
| 14 | L | 0.250 |
| 15 | H | 0.250 |
| 16 | L | 0.250 |
| 17 | H | 0.250 |
| 18 | L | 0.250 |
| 19 | H | 0.250 |
| 20 | L | 0.250 |
| 21 | H | 0.250 |
| 22 | L | 0.250 |
| 23 | H | 0.250 |
| 24 | L | 0.250 |
| 25 | H | 0.250 |
| 26 | L | 0.250 |
| 27 | H | 0.250 |
| 28 | L | 0.250 |
| 29 | H | 0.250 |
| 30 | L | 0.240 |
| 31 | H | 0.188 |
| 32 | L | 0.256 |
| 33 | H | 0.226 |
| 34 | L | 0.382 |
| MEDIUM | AIR | |

A table 1 shows the structure of the filter 14. This filter 14 was formed by stacking TiO$_2$ films (H layer) and SiO$_2$ films (L layer) alternately on a glass substrate until a 34th layer was stacked. The thickness of each optical film of the filter 14 was determined on the condition that a design wavelength was 515 nm, the refractivity of the TiO$_2$ film was 2.3723, and the refractivity of the SiO$_2$ film was 1.4565. The physical thickness of each layer was a product of its optical thickness, the refractivity of material of its film and the design wavelength, which were all shown in the table 1.

TABLE 2

DESIGN WAVELENGTH: 590 nm
INCIDENT LIGHT ANGLE: 42.1 degrees
H (TiO$_2$): 2.3223
L (SiO$_2$): 1.4528

| LAYER NUMBER | MATERIAL | OPTICAL THICKNESS |
|---|---|---|
| SUBSTRATE | GLASS | |
| 1 | H | 0.113 |
| 2 | L | 0.315 |
| 3 | H | 0.191 |
| 4 | L | 0.277 |
| 5 | H | 0.236 |
| 6 | L | 0.263 |
| 7 | H | 0.248 |
| 8 | L | 0.271 |
| 9 | H | 0.242 |
| 10 | L | 0.269 |
| 11 | H | 0.255 |
| 12 | L | 0.237 |
| 13 | H | 0.292 |
| 14 | L | 0.203 |
| 15 | H | 0.312 |
| 16 | L | 0.209 |
| 17 | H | 0.252 |
| 18 | L | 0.288 |
| 19 | H | 0.127 |
| 20 | L | 0.681 |
| MEDIUM | AIR | |

A table 2 shows the structure of the mirror 16. The mirror 16 was formed by stacking TiO$_2$ films (H layer) and SiO$_2$ films (L layer) alternately on a glass substrate, so that first to 20th layers were formed. The thickness of optical film of the mirror 16 was determined on the condition that a design wavelength was 590 nm, the refractivity of the TiO$_2$ film was 2.3223, and the refractivity of the SiO$_2$ film was 1.4528.

Figure 3A:
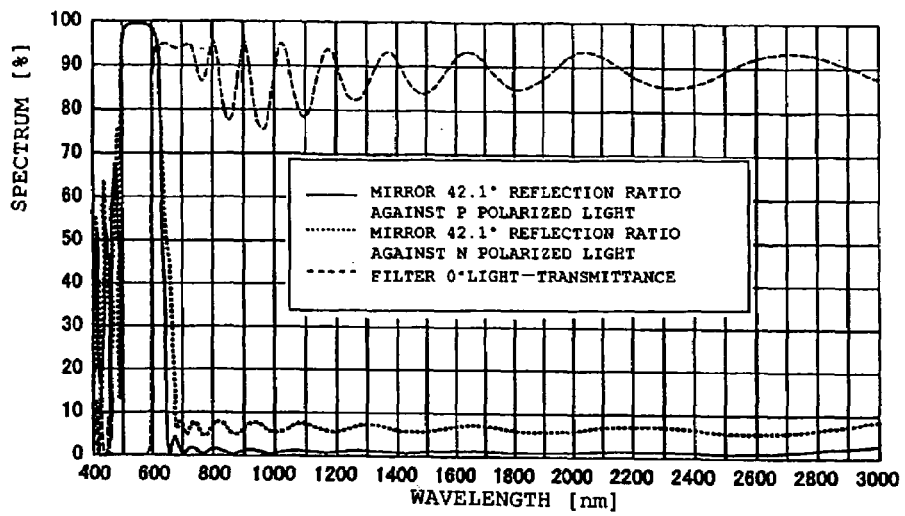
FIG. 3A is a graph showing the individual spectral characteristics of the filter 14 and the mirror 16.

Referring to FIG. 3A, the spectral characteristics of the filter 14 refer to the dependence of the light-transmittance on wavelengths. Meanwhile, the spectral characteristics of the mirror 16 refer to the dependence of the reflection ratio on wavelengths.

The light which is transmitted from the LCD 24 and which is incident to the mirror 16 contains P polarization alone. Therefore, the reflection ratio of the mirror 16 for P polarized light is equal to that of the mirror 16 for incident light transmitted from the LCD 24. On the other hand, the light incident to the mirror 16 through the front window 20, that is, ambient light contains P and S polarizations. In FIG. 3A, N polarized light means light containing P and S polarizations in the ratio 1:1. Therefore, the reflection ratio of N polarized light is equal to the reflection ratio of the ambient light.

Figure 3B:
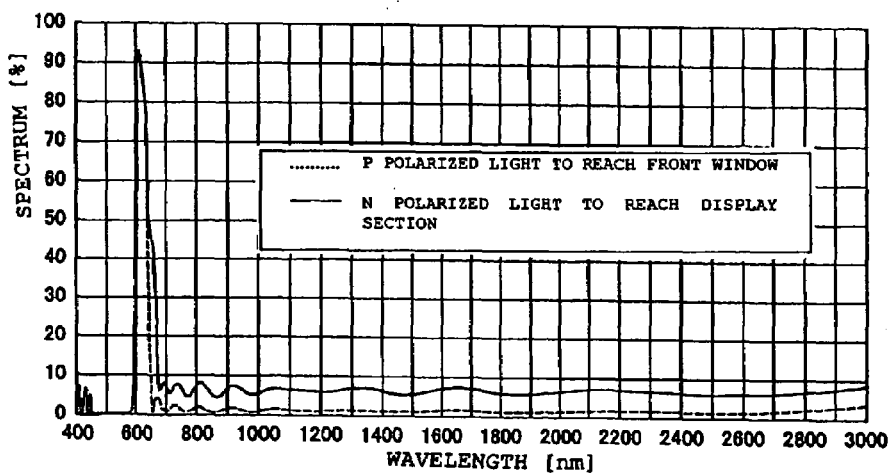
FIG. 3B is a graph showing the spectral (combined) characteristics of a filter unit composed of the filter 14 and the mirror 16.

Referring to FIG. 3B, the combined characteristics were constituted by the individual spectral characteristics of the filter 14 and the mirror 16. "P polarized light to reach front window" characteristics were defined by P2/P1. P1 represented the amount of light (P polarized light) incident to the filter 14 from the display section 12, and P2 represented the amount of light (P polarized light) reaching the front window 20 through the filter 14 and the mirror 16. "N polarized light to reach display section" characteristics were defined by P4/P3. P3 indicated the amount of light (N polarized light) incident to the mirror 16 through the front window 20, and P4 indicated the amount of light (N polarized light) reaching the display section 12 through the mirror 16 and the filter 14.

As exhibited by this combined characteristics, when light from the display section 12 was incident to the combination of both the filter 14 and the mirror 16, this combination transmitted only burnt orange light with wavelengths of 617±15 nm (602 to 632 nm, band width of 30 nm). Furthermore, it blocked visible light with other wavelengths. In conclusion, this example showed that the display device 10 transmitted only light of a narrow wavelength band even when light of a visible light region is incident thereto. Also, the example showed that it greatly attenuated light of other bands. Accordingly, it was found that this display device could display the projection of images with clear colors.

In this example, the combined characteristics of both the filter 14 and the mirror 16 exhibited spectral characteristics excellent enough to be used over a wide wavelength range covering visible light and near infrared ray regions (about 420 nm to 3000 nm). Therefore, even when unwanted light, such as infrared ray, entered the mirror 16 through the front window 20, this combination could block the unwanted light from reaching display section 12. This contributed to the reduction in deterioration of the display device 10 due to heat generated by light.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A display device for projecting an image, comprising:
an LED for emitting light;
an optical member which selectively outputs light components having wavelengths not shorter than a predetermined minimum-limit wavelength, the minimum-limit wavelength being shorter than a peak wavelength of the light from the LED and lying within a FWHM of the light from the LED; and
a mirror which selectively reflects light components having wavelengths not longer than a predetermined maximum-limit wavelength, the maximum-limit wavelength being longer than the peak wavelength of the light from the LED and lying within the FWHM of the light from the LED,
wherein one of the optical member and the mirror is positioned to receive the light from the LED and to output or reflect the light components having the wavelengths not shorter than the minimum-limit wavelength or the light components having the wavelengths not longer than the maximum-limit wavelength to the other one of the optical member and the mirror.

2. The display device according to claim 1, wherein respective light intensities of the LED at the minimum-limit and maximum-limit wavelengths are set to be at least 10% of that at the peak wavelength.

3. The display device according to claim 2, wherein the mirror reflects light components, of which wavelength is the maximum-limit wavelength or shorter, from incident light from the LED.

4. The display device according to claim 2, wherein the optical member comprises a filter which allows light components, of which wavelength is the minimum-limit wavelength or longer, to pass through.

5. The display device according to claim 4, wherein the filter does not allow light components, of which wavelength is the minimum-limit wavelength or shorter, from incident light from the LED to pass through, but reflects these light components.

6. The display device according to claim 1, wherein the mirror reflects light components, of which wavelength is the maximum-limit wavelength or shorter, from incident light from the LED.

7. The display device according to claim 6, wherein the optical member comprises a filter which allows light components, of which wavelength is the minimum-limit wavelength or longer, to pass through.

8. The display device according to claim 7, wherein the filter does not allow light components, of which wavelength is the minimum-limit wavelength or shorter, from incident light from the LED to pass through, but reflects these light components.

9. The display device according to one of claims 1 through 8,
wherein the display device comprises a head up display for a vehicle, and
wherein the other of the optical member and the mirror projects an image on a front window of a vehicle.

10. The display device according to claim 1, wherein the optical member comprises a filter which allows light components, of which wavelength is the minimum-limit wavelength or longer, to pass through.

11. The display device according to claim 10, wherein the filter does not allow light components, of which wavelength is the minimum-limit wavelength or shorter, from incident light from the LED to pass through, but reflects these light components.

12. The display according to claim 1, further comprising a LCD device positioned between one of the optical member and the mirror to form an image using the light from the LED.

13. A head up display for a vehicle, comprising:
a light source;
an optical member which selectively outputs light components having wavelengths not shorter than a predetermined minimum-limit wavelength, the minimum-limit wavelength being shorter than a peak wavelength of light from the light source and lying within a FWHM of the light from the light source; and
a mirror which selectively reflects light components having wavelengths not longer than a predetermined maximum-limit wavelength, the maximum-limit wavelength being longer than the peak wavelength of the light from the light source and lying within the FWHM of the light from the light source,
wherein one of the optical member and the mirror is positioned to receive the light from the light source and to output or reflect the light components having wavelengths not shorter than the minimum-limit wavelength or the light components having wavelengths not longer than the maximum-limit wavelength to the other one of the optical member and the mirror.

14. The head up display according to claim 13, wherein the other one of the optical member and the mirror is positioned to project an image formed by the light components from other one of the optical member and the mirror on a front window of a vehicle.

15. The head up display according to claim 13, further comprising a LCD device positioned between the light source and one of the optical member and the mirror to form an image using the light from the light source.

16. The head up display according to claim 13, wherein the light source comprises an LED.

17. The head up display according to claim 13, further comprising a LCD device positioned between the light source and one of the optical member and the mirror to form an image using the light from the light source, wherein the light source comprises an LED.

18. The head up display according to claim 13, wherein the light source has light intensities at the minimum-limit and maximum-limit wavelengths which are set to be at least 10% of a light intensity at the peak wavelength.

19. The head up display according to claim 13, wherein the mirror reflects light components, of which wavelength is the maximum-limit wavelength or shorter, from incident light from the light source.

20. The head up display according to claim 13, wherein the optical member comprises a filter which allows light components, of which wavelength is the minimum-limit wavelength or longer, to pass through.

* * * * *